US 8,719,900 B2

(12) United States Patent
MacCarthaigh

(10) Patent No.: US 8,719,900 B2
(45) Date of Patent: May 6, 2014

(54) VALIDATING UPDATES TO DOMAIN NAME SYSTEM RECORDS

(75) Inventor: Colm G. MacCarthaigh, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 592 days.

(21) Appl. No.: 12/782,227

(22) Filed: May 18, 2010

(65) Prior Publication Data
US 2012/0017259 A1    Jan. 19, 2012

(51) Int. Cl.
*H04L 29/06*    (2006.01)

(52) U.S. Cl.
CPC .............. *H04L 63/107* (2013.01); *H04L 63/20* (2013.01)
USPC ................ 726/2; 726/1; 726/3; 726/4; 726/5; 726/7; 713/100

(58) Field of Classification Search
USPC ............................................................ 726/2
See application file for complete search history.

(56) References Cited

U.S. PATENT DOCUMENTS

| 2007/0067465 | A1* | 3/2007 | Blinn et al. ................... 709/229 |
| 2007/0078936 | A1* | 4/2007 | Quinlan et al. ............... 709/206 |
| 2007/0204341 | A1  | 8/2007 | Rand |
| 2009/0019517 | A1  | 1/2009 | Turakhia |

OTHER PUBLICATIONS

International Search Report and Written Opinion dated Jul. 8, 2011.

* cited by examiner

*Primary Examiner* — Longbit Chai
(74) *Attorney, Agent, or Firm* — Thomas Horstemeyer, LLP

(57) ABSTRACT

Disclosed are various embodiments for validating updates to domain name system (DNS) records. A request is received to modify at least one DNS record associated with a domain owned by a domain owner. The request to modify the at least one DNS record is compared with at least one policy. The at least one policy is configurable by the domain owner. The requested modification to the at least one DNS record is selectively granted based at least upon the comparison.

20 Claims, 4 Drawing Sheets

VALIDATING UPDATES TO DOMAIN NAME SYSTEM RECORDS

BACKGROUND

A hierarchical naming system known as the Domain Name System (DNS) allows computers, services, or any resource connected to the Internet or a private network to be referred to by names, such as www.foo.com. DNS servers cooperate to translate domain names that are meaningful to humans into numeric addresses that are used for computer-to-computer communication.

DNS servers can be targets of "domain jacking," whereby an attacker hijacks control of a domain name. Conventional security measures for DNS servers do not provide a robust defense against domain jacking. In the simplest form of attack, an administrator's account credentials are guessed, or gained via a man-in-the-middle attack by way of malware on the administrator's computer. Once these credentials have been compromised, attackers can then modify records used by the DNS servers to direct traffic for the domain elsewhere, such as a propaganda website or a phishing website.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to controlling access to DNS records. In various embodiments, the present disclosure improves the security of DNS servers and reduces the threat of domain jacking by preventing updates to DNS records when an update does not conform to a policy. Update policies describe possible changes to a field in a DNS record, in terms of either allowable changes or prohibited changes. Policies can describe allowable changes in terms of resources owned by the domain owner. An example of an update policy might be "ensure that all mail server records identify a domain owned by the domain owner and ultimately point to infrastructure controlled by the domain owner."

In various embodiments, the present disclosure determines whether the requested change to a field of the DNS record would violate a condition specified in the policy. Based on the results of applying the policy, the administrator's request to update the record is either granted or denied. The present disclosure also provides for the configuration of update policies by the administrator, on behalf of the domain owner. In some embodiments, configuring an update policy requires a second level of authentication, which is more inconvenient than the authentication required for purposes of updating a DNS record. In the following discussion, a general description of the system and its components is provided, followed by a discussion of the operation of the same.

Figure 1:
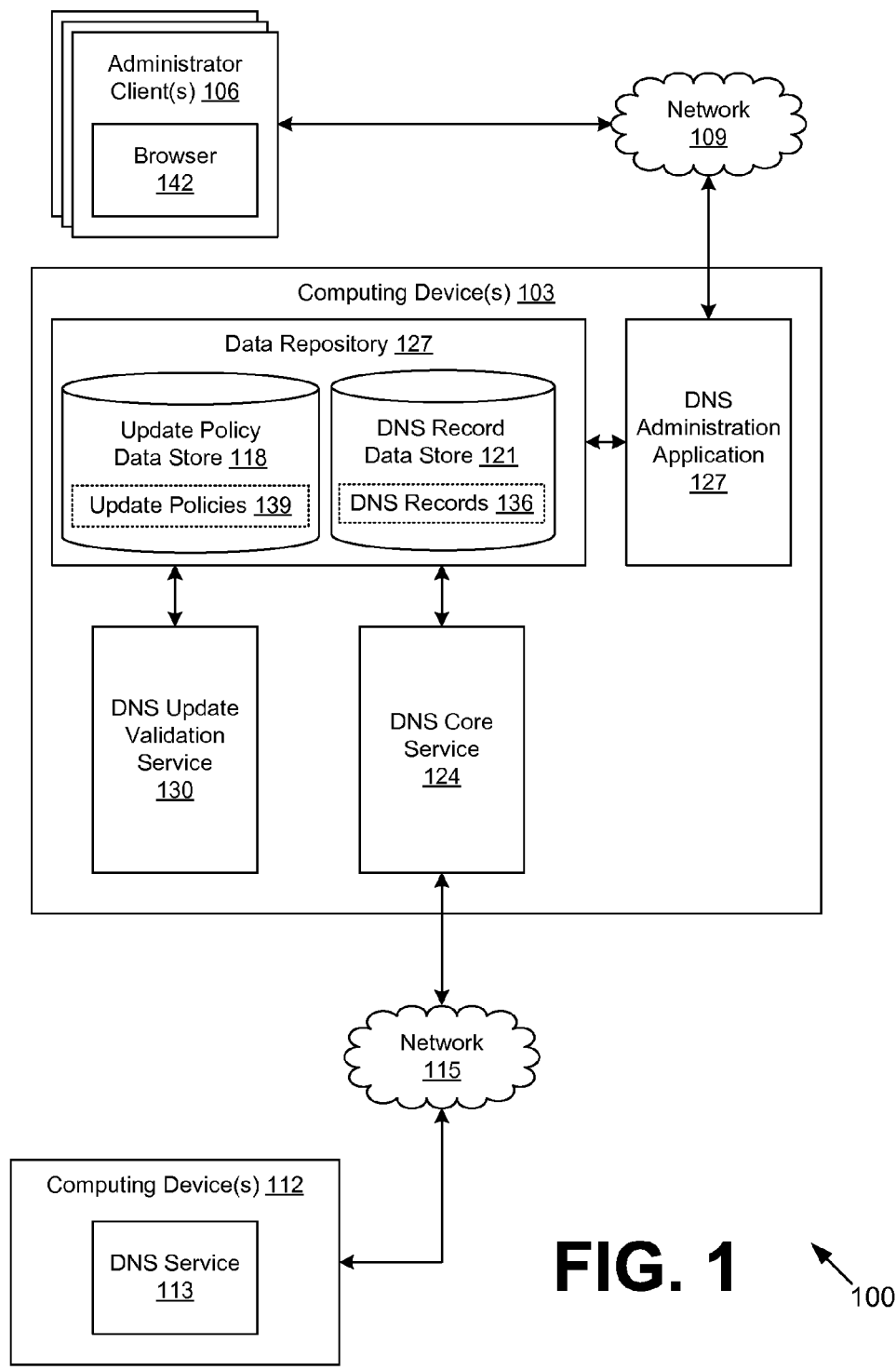
FIG. 1 is a drawing of a networked environment according to various embodiments of the present disclosure.

With reference to FIG. 1, shown is a networked environment 100 according to various embodiments. The networked environment 100 includes a computing device 103 that is in data communication with one or more administrator clients 106 by way of a network 109. The computing device 103 may also be in communication with one or more computing devices 112 by way of a network 115. In various embodiments, the network 109 and the network 115 may be the same network or a different network. The networks 109, 115 may include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. To this end, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Various data is also stored in an update policy data store 118 and/or a DNS record data store 121 that is accessible to the computing device 103. The update policy data store 118 may be representative of a plurality of DNS policy data stores 118 as can be appreciated. The DNS record data store 121 may be representative of a plurality of DNS record data stores 121 as can be appreciated. The data stored in the update policy data store 118 and/or the DNS record data store 121, for example, is associated with the operation of the various applications and/or functional entities described below.

The components executed on the computing device 103, for example, include a DNS core service 124, a DNS administration application 127, a DNS update validation service 130, and other applications, services, processes, systems, engines, or functionality not discussed in detail herein. The DNS core service 124 is executed to provide name resolution services to various components, such as administrator client 106, by implementing the DNS protocol (described in standards such as Request for Comment (RFC) 1034, RFC 1035, etc.). The DNS core service 124 provides name resolution services by communicating with other components that also implement the DNS protocol, such as a DNS service 133. In particular, the DNS core service 124 accesses DNS records 136 in the DNS record data store 121 in order to respond to DNS queries from other DNS components. The DNS core service 124 also sends DNS queries to other DNS components when appropriate. DNS query and response behavior is described in more detail in the various DNS standards.

The DNS administration application 127 is executed to provide an administrator interface to DNS records 136 in the DNS record data store 121 to the administrator client 106, such that an owner of a particular domain (or an administrator acting on behalf of the domain owner) can update DNS records 136 associated with the domain. In this disclosure, the term update as applied to DNS records includes adding and deleting records as well as modifying the contents of existing records. To accomplish this, the DNS administration application 127 may generate one or more network pages comprising user interfaces that are sent to the administrator client 106 over the network 109. In various embodiments, the DNS administration application 127 may utilize any type of middleware framework to communicate with a client application executing on the administrator client 106. Examples of such frameworks include remote procedure calls, service-oriented architecture (SOA), representational state transfer (REST), and other frameworks.

The DNS update validation service 130 is executed to validate requests to add, modify, or delete DNS records 136 associated with a particular domain. Such requests, referred to herein as "update" requests, are made by the owner of the particular domain through administrator client 106. The DNS update validation service 130 ensures that an update request conforms to the update policies 139 stored in update policy data store 118. The DNS update validation service 130 is also executed to perform authentication of the domain owner that requests a DNS update before the update is performed.

The administrator client 106 is representative of a plurality of client devices that may be coupled to the network 109. The administrator client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The administrator client 106 may be configured to execute various applications such as a browser 142 and/or other applications. The administrator client 106 may be executed in an administrator client 106, for example, to access and render network pages, such as web pages, or other network content served up by the administrator client 106 and/or other servers. The administrator client 106 may be configured to execute applications beyond the browser 142 such as, for example, email applications, instant message applications, and/or other applications.

The computing device 112 may comprise, for example, a server computer or any other system providing computing capability. Alternatively, a plurality of computing devices 112 may be employed that are arranged, for example, in one or more server banks or computer banks or other arrangements. To this end, a plurality of computing devices 112 together may comprise, for example, a cloud computing resource, a grid computing resource, and/or any other distributed computing arrangement. Such computing devices 112 may be located in a single installation or may be dispersed among many different geographical locations. In one embodiment, the computing device 112 represents a virtualized computer system executing on one or more physical computing systems. For purposes of convenience, the computing device 112 is referred to herein in the singular. Even though the computing device 112 is referred to in the singular, it is understood that a plurality of computing devices 112 may be employed in the various arrangements as described above.

Various applications and/or other functionality may be executed in the computing device 112 according to various embodiments. The components executed on the computing device 112, for example, include a DNS service 133 and other applications, services, processes, systems, engines, or functionality not discussed in detail herein. The DNS service 133 is executed to implement the DNS protocol, by communicating with other components that also implement the protocol, such as DNS core service 124.

Next, a general description of the operation of the various components of the networked environment 100 is provided. To begin, a user at an administrator client 106 may communicate over the network 109 with the DNS administration application 127 to request a user interface that allows updates to DNS records 136 stored in the DNS record data store 121. To accomplish this, the DNS administration application 127 may, in one embodiment, generate one or more network pages comprising the user interfaces for updating DNS records. The DNS administration application 127 then sends the generated network page over the network 109 to the administrator client 106, which is then rendered by the browser 142.

Before the user is allowed to update any DNS records 136, the administrator client 106, in cooperation with the DNS administration application 127, authenticates the user in some manner (e.g., username and password). The authentication process associates the user with a particular domain name or set of domain names that is owned by a single entity. Updates are limited to records associated with the authenticated domain name(s).

The domain owner interacts with the network page to indicate an update to a DNS record 136 or set of records. Such an update may comprise, for example, creating one or more new records, deleting one or more existing records, or modifying the contents of one or more existing records. As one non-limiting example, the domain owner may change the Internet Protocol (IP) address range associated with a particular domain name. As another non-limiting example, the domain owner may add a DNS record 136 which associates a new canonical name with a particular domain name. As yet another non-limiting example, the domain owner may delete an existing DNS record 136 which associates one domain name with another. The administrator client 106 then sends information from the network page, describing the update DNS record request, over the network 109 to the DNS administration application 127.

In another embodiment, the administrator client 106 may generate the user interface locally rather than receiving an interface from the DNS administration application 127. In such an embodiment, the domain owner interacts with the locally generated user interface to indicate an update to a DNS record 136 or set of records, in the manner described above. The administrator client 106 then generates a DNS update request based on this interaction, and sends the DNS update request to the DNS administration application 127, for example, through a network service such as a web service.

A request to update a DNS record describes the record(s) being updated, and the change to be made to the data field of the record. As one non-limiting example, a request to update a DNS address record may describe the record as "A-record having address value=196.44.10.10" and the change to be made as "modify value to 196.88.10.10." As another non-limiting example, a request to update may describe the record as "all mail server records" and the change to be made as "delete". As noted above, all update requests pertain to records associated with the authenticated domain owner. Therefore, the update request "delete all mail server records" implicitly applies only to those mail server records associated with the domain owner, and not to all mail server records in the DNS record data store 121.

After obtaining a DNS update request, the DNS administration application 127 passes the DNS update request on to the DNS update validation service 130 for validation. DNS update requests pass through the DNS administration application 127, and then DNS administration application 127 has to authenticate the user as the domain owner. Therefore, update requests received by the DNS update validation service 130 are limited to records associated with a particular domain name or set of domain names.

The DNS update validation service 130 validates the DNS update request by applying one or more appropriate update policies 139 stored in the update policy data store 118. To this end, the DNS update validation service 130 determines whether the requested change to an identifier field (e.g., IP address field, domain name field) of the DNS record 136 would violate the condition in an update policy 139. Based on the results of applying the update policies 139, the DNS update validation service 130 grants or denies the update request. An update policy 139 specifies at least one DNS record type and at least one condition to be enforced on the record's data field during the update. Conditions may be negative (expressed in terms of a prohibited modification to a DNS record) or positive (expressed in terms of an allowable modification to a DNS record).

To validate the update request, the DNS update validation service 130 finds an update policy 139 that matches the type of DNS record being updated. The DNS update validation service 130 examines the requested change to the DNS record and determines whether the requested change would violate a condition in the update policy 139. As one non-limiting example, if the request was to update a particular A-record with a new address field 196.88.10.10, and the update policy 139 for A-records specified the condition "must be in the range 168.*.*.*", then the DNS update validation service 130 would deny the update request. The request would be denied because 196.88.10.10 is not in the range 168.*.*.*, and therefore the updated DNS record would violate the condition specified by the update policy 139.

A condition involving an IP address may specify a specific address, an address range, or multiple address ranges. The address ranges may be discontiguous. A condition may specify a particular domain name or a list of domain names. The list may be a whitelist or a blacklist. When a condition contains a whitelist, the update is allowed as long as the new domain name is included in the list. When the condition contains a blacklist, the update is prohibited whenever the new domain name is included in the list. Whitelists and blacklists may also be used with IP addresses.

Another example of a condition is the "all owner domains" condition, in which the update is allowed as long as the new address or new domain name is one that is also owned by the authenticated domain owner. For example, a domain owner may own abc.com as well as foo.com. In that case, the policy including the CNAME record type and the all owner domains condition would allow a new CNAME record that points www.foo.com to bigserver.abc.com, because both are owned by the same entity.

Yet another example of a condition is the "owner infrastructure" condition, in which the update is allowed as long as the new identifier field ultimately points to infrastructure controlled by the authenticated domain owner. In some embodiments, the identifier field is an address field or a domain name field.

Figure 2:
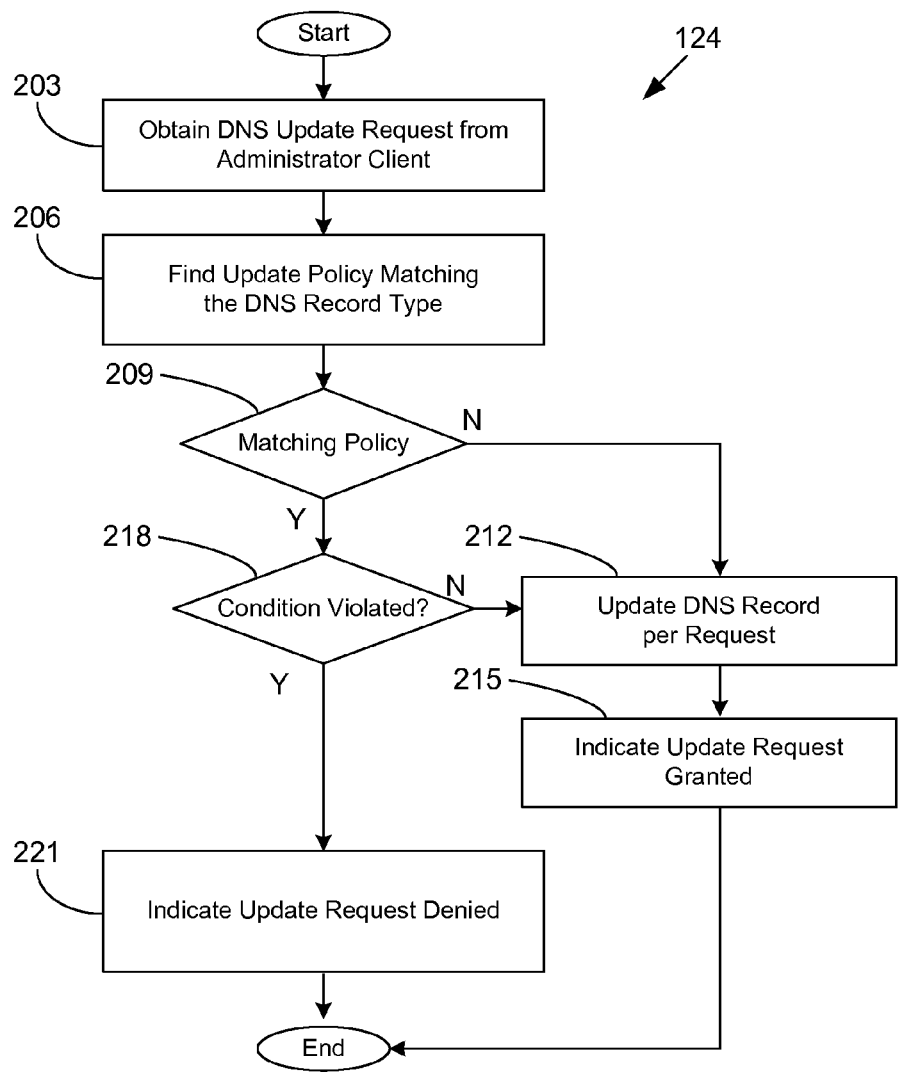
FIGS. 2 and 3 are flowcharts illustrating examples of functionality implemented as portions of a DNS validation server executed in a computing device in the networked environment of FIG. 1 according to various embodiments of the present disclosure.

Moving now to FIG. 2, shown is a flowchart that provides one example of the operation of a portion of the DNS update validation service 130 according to various embodiments. It is understood that the flowchart of FIG. 2 provides merely an example of the many different types of functional arrangements that may be employed to implement the operation of the portion of the DNS update validation service 130 as described herein. As an alternative, the flowchart of FIG. 2 may be viewed as depicting an example of steps of a method implemented in the computing device 103 (FIG. 1) according to one or more embodiments.

Beginning with box 203 the DNS update validation service 130 obtains a DNS update request from DNS administration application 127. As noted above, the update request originates from an administrator client 106 over a network 109, and the DNS administration application 127 passes the request on to the DNS update validation service 130. As a non-limiting example, the update request may be conveyed by way of hypertext transfer protocol (HTTP), SOAP, and/or some other protocol.

Next, in box 206, the DNS update validation service 130 finds an update policy 139 that matches the type of DNS record being updated. In box 209, the DNS update validation service 130 determines whether any matching update policy 139 was found. If, in box 209, the DNS update validation service 130 determines that no matching update policies 139 were found, the DNS update validation service 130 moves to box 212.

In box 212, the DNS update validation service 130 updates the DNS record 136 in accordance with the update request. In some embodiments, this involves using the services of the DNS core service 124. In box 215, the DNS update validation service 130 indicates that the update request was granted. The administrator client 106 is notified of this result. Thereafter, the DNS update validation service 130 ends.

If, instead, in box 209 the DNS update validation service 130 determines that a matching update policy 139 was found, the DNS update validation service 130 proceeds to box 218. In box 218, the DNS update validation service 130 examines the requested update to the DNS record 136 and determines whether the requested update would violate the condition in the update policy 139. If, in box 218, the DNS update validation service 130 determines that the condition would be violated, the DNS update validation service 130 moves to box 221. In box 221, the DNS update validation service 130 indicates that the update request was denied. The administrator client 106 is notified of this result. Thereafter, the DNS update validation service 130 ends.

If, instead, in box 218, the DNS update validation service 130 determines that the condition in the matching update policy 139 would not be violated, the DNS update validation service 130 moves to box 212. In box 212, the DNS update validation service 130 updates the DNS record 136 in accordance with the update request. In box 215, the DNS update validation service 130 indicates that the update request was granted. The administrator client 106 is notified of this result. Thereafter, the DNS update validation service 130 ends.

Figure 3:
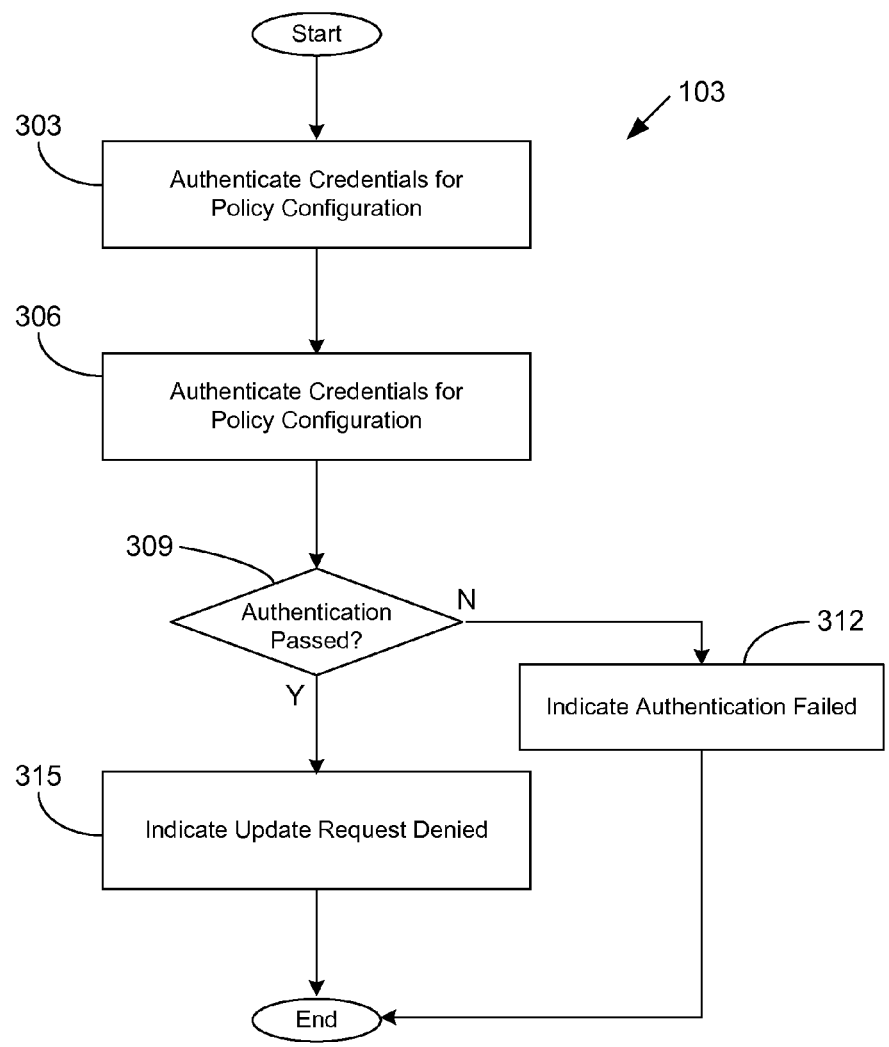

Turning to FIG. 3, shown is a flowchart that provides another example of the operation of a portion of the DNS update validation service 130 according to various embodiments. It is understood that the flowchart of FIG. 3 provides merely an example of the many different types of functional arrangements that may be employed to implement the operation of the portion of the DNS update validation service 130 as described herein. As an alternative, the flowchart of FIG. 3 may be viewed as depicting an example of steps of a method implemented in the computing device 103 (FIG. 1) according to one or more embodiments.

Beginning with box 303, the DNS update validation service 130 receives credentials representing the domain owner from the administrator client 106. These credentials are for purposes of configuring update policies 139. In other words, once authenticated with these credentials, the domain owner is permitted to create new update policies 139, delete existing update policies 139, and modify existing update policies 139. In some embodiments, the DNS administration application 127 may serve as an intermediary between the DNS update validation service 130 and the administrator client 106. In other embodiments, the DNS administration application 127 is not involved in obtaining these credentials.

Next, in box 306, the DNS update validation service 130 authenticates the received credentials to determine whether the domain owner is authorized to configure update policies 139. The authentication performed in box 306 is in addition to the authentication which determines whether a user can update DNS records 136 in DNS record data store 121. In some embodiments, the authentication mechanism used for purposes of policy configuration is a different mechanism than the one used for purposes of DNS record updates. In some of these embodiments, the authentication mechanism used for purposes of policy configuration imposes a greater degree of inconvenience than does the one used for purposes of DNS record updates, such that the configuration of update policies 139 is more difficult to hack than DNS record updates. Examples of authentication mechanisms for policy configuration include requiring the domain owner to provide a hardware-based authentication token, to be identified through biometrics, or to place a voice call and speak to a human representative or to an interactive voice response system.

In box 309, the DNS update validation service 130 determines whether the policy configuration authentication passed or failed. If, in box 309, the DNS update validation service 130 determines that the policy configuration authentication failed, the DNS update validation service 130 moves to box 312. In box 312, the DNS update validation service 130 notifies the administrator client 106 that the policy configuration authentication failed. Thereafter, the DNS update validation service 130 ends.

If, in box 309, the DNS update validation service 130 determines that the policy configuration authentication passed, the DNS update validation service 130 moves to box 315. In box 315, the domain owner is allowed to configure update policies 139. Various configuration mechanisms may be used. Configuration may be provided, for example, by a user interface that is generated by the DNS administration application 127 and presented to the domain owner by the browser 142, which executes on the administrator client 106. Alternatively, update policies 139 may take the form of a text file, such that a domain owner configures an update policy 139 by editing the text file at the administrator client 106 and uploads the edited text file to the computing device 103 which then executes the DNS update validation service 130. When the domain owner has finished configuring the update policies 139, the DNS update validation service 130 ends.

Figure 4:
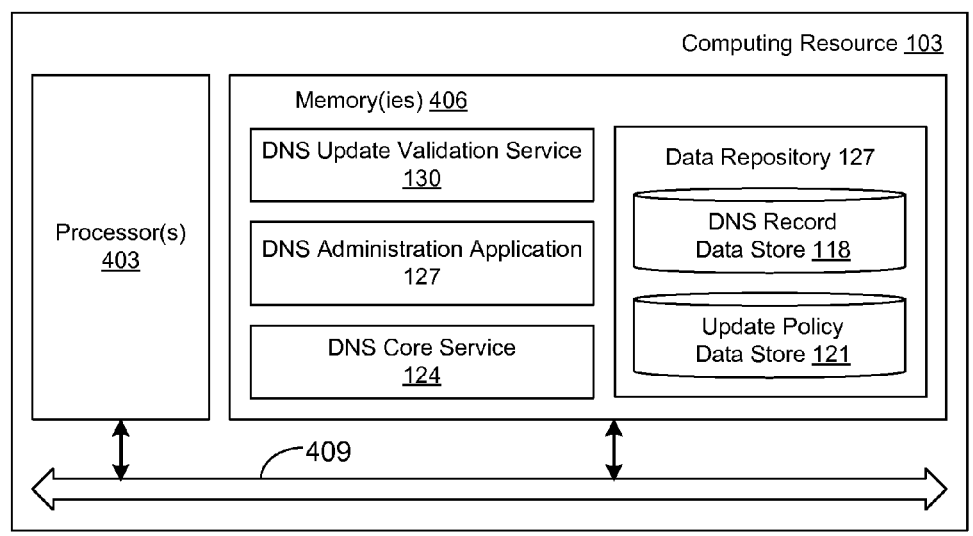
FIG. 4 is a schematic block diagram that provides one example illustration of a computing device employed in the networked environment of FIG. 1 according to various embodiments of the present disclosure.
Figure 4:
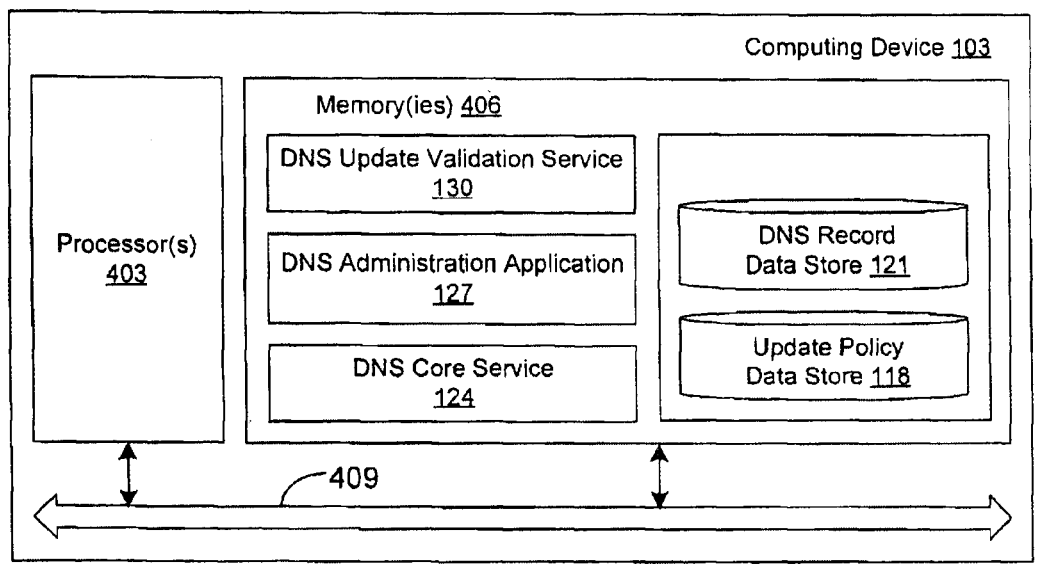

Referring next to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the DNS core service 124, the DNS administration application 127, the DNS update validation service 130, and potentially other applications. Also stored in the memory 406 may be an update policy data store 118, a DNS record data store 121, and other data. In addition, an operating system may be stored in the memory 406 and executable by the processor 403. While not illustrated, the computing device 112 also includes components like those shown in FIG. 4, whereby the DNS service 133 is stored in a memory and executable by a processor.

It is understood that there may be other applications that are stored in the memory 406 and are executable by the processor 403, as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format, such as object code, that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109, 115 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the DNS core service 124, the DNS administration application 127, the DNS update validation service 130, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the DNS update validation service 130. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the DNS core service 124, the DNS administration application 127, the DNS update validation service 130, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that authenticates a domain owner for purposes of domain name system (DNS) record modification using a first mechanism of authentication;
   code that receives a request to modify at least one DNS record associated with a first domain owned by the domain owner;
   code that validates the request by applying at least one policy to the request, the validation responsive to success of the authentication, the at least one policy prohibiting modifications of the DNS record that refer to an identifier that is outside of an infrastructure controlled by the domain owner while permitting modifications of the DNS record that is part of the first domain when the modified DNS record is part of a second domain also owned by the domain owner;
   code that denies the request to modify the at least one DNS record responsive to failure of the validation;
   code that authenticates the domain owner for purposes of policy configuration using a second mechanism of authentication for the domain owner, wherein the second mechanism of authentication for configuring the at least one policy is different than the first mechanism used for DNS record updates;
   code that receives a request to configure the at least one policy; and
   code that denies the request to configure responsive to failure of the authentication for purposes of policy configuration.

2. The computer-readable medium of claim 1, further comprising code that grants the request to configure responsive to success of the authentication.

3. The computer-readable medium of claim 1, wherein the code that validates determines that an IP address field is present in the at least one DNS record and successfully validates the request to modify conditional at least upon the address field being contained within one or more ranges specified by the at least one policy.

4. The computer-readable medium of claim 1, wherein the code that validates determines that a canonical name is present in the at least one DNS record and successfully validates the request to modify conditional at least upon the canonical name being on a whitelist specified by the at least one policy.

5. The computer-readable medium of claim 1, wherein the code that validates determines that an exchange domain name is present in the at least one DNS record and successfully validates the request to modify conditional upon the exchange domain name being within the infrastructure controlled by the domain owner.

6. A system, comprising:
   at least one computing device; and
   a domain name system (DNS) policy manager executable in the at least one computing device, the DNS policy manager comprising:
   logic that validates request a request to modify a DNS record associated with a domain owned by a domain owner by applying at least one policy to the request, the validation responsive to success of authentication of the domain owner, the policy prohibiting modifications of the DNS record that point outside of an infrastructure controlled by the domain owner while permitting modifications of the DNS record that is part of the domain when the modified DNS record is part of a second domain also owned by the domain owner;
   logic that selectively grants a requested modification to the at least one DNS record based at least upon an application of the at least one policy; and
   logic that authenticates the domain owner for purposes of policy configuration using a different second mechanism of authentication for the domain owner.

7. The system of claim 6, the DNS policy manager further comprising logic that configures the at least one policy responsive to a configuration request by the domain owner.

8. The system of claim 6, wherein the logic that selectively grants the requested modification grants the requested modification conditional at least upon an IP address in the at least one DNS record being contained within at least one range specified by the at least one policy.

9. The system of claim 6, wherein the logic that selectively grants the requested modification grants the requested modification conditional at least upon a name in the at least one DNS record being part of another domain also owned by the domain owner.

10. The system of claim 6, wherein the logic that selectively grants the requested modification grants the requested modification conditional at least upon a name in the at least one DNS record being within the infrastructure controlled by the owner.

11. The system of claim 6, wherein the logic that selectively grants the requested modification grants the requested modification conditional at least upon a name in the at least one DNS record being contained within a whitelist specified by the at least one policy.

12. A computer implemented method, comprising:
    receiving, in a computing device, a request to modify at least one domain name system (DNS) record associated with a first domain owned by a domain owner;
    comparing, via the computing device, the request to modify the at least one DNS record with at least one policy, the at least one policy prohibiting modifications of the at least one DNS record that point outside of an infrastructure controlled by the domain owner while permitting the request to modify the at least one DNS record that is part of the first domain when the modified at least one DNS record is part of a second domain also owned by the domain owner, the at least one policy being configurable by the domain owner;
    selectively granting, via the computing device, the requested modification to the at least one DNS record based at least upon the comparison; and
    authenticating, via the computing device, the domain owner for purposes of policy configuration using a different second mechanism of authentication for the domain owner.

13. The computer implemented method of claim 12, further comprising:
    configuring, via the computing device, the at least one policy responsive to a configuration request by the domain owner.

14. The computer implemented method of claim 13, further comprising:
    authenticating, via the computing device, the domain owner for purposes of policy configuration; and
    denying, via the computing device, the configuration request responsive to failure of the authentication.

15. The computer implemented method of claim 13, further comprising:
    authenticating, via the computing device, the domain owner, using a first authentication mechanism, for purposes of DNS record modification;
    denying, via the computing device, the requested modification to the at least one DNS record responsive to failure of the authentication using the first authentication mechanism;
    authenticating, via the computing device, the domain owner, using a second authentication mechanism that is different than the first authentication mechanism, for purposes of policy configuration; and
    denying, via the computing device, the configuration request responsive to failure of the authentication using the second authentication mechanism.

16. The computed implemented method of claim 13, further comprising:
    authenticating, via the computing device, the domain owner, using a first authentication mechanism, for purposes of DNS record modification;
    denying, via the computing device, the requested modification to the at least one DNS record responsive to failure of the authentication using the first authentication mechanism;
    authenticating, via the computing device, the domain owner, using a second authentication mechanism, the second authentication mechanism being used for purposes of policy configuration; and
    denying, via the computing device, the configuration request responsive to failure of the authentication using the second authentication mechanism.

17. The computer implemented method of claim 12, wherein the at least one policy prohibits modifications of the at least one DNS record that point outside of infrastructure controlled by the domain owner.

18. The method of claim 12, further comprising granting, via the computing device, the requested modification conditional at least upon an IP address in the at least one DNS record being contained within at least one range specified by the policy.

19. The method of claim 12, further comprising granting, via the computing device, the requested modification conditional at least upon a name in the at least one DNS record being within infrastructure controlled by the owner.

20. The method of claim 12, further comprising granting, via the computing device, the requested modification conditional at least upon a name in the at least one DNS record being contained within a whitelist specified by the policy.

\* \* \* \* \*

UNITED STATES PATENT AND TRADEMARK OFFICE
CERTIFICATE OF CORRECTION

PATENT NO. : 8,719,900 B2
APPLICATION NO. : 12/782227
DATED : May 6, 2014
INVENTOR(S) : Colm G. MacCarthaigh It is certified that error appears in the above-identified patent and that said Letters Patent is hereby corrected as shown below:

In the Drawings
Fig. 4, "Data Repository 127" should be deleted as shown on the attached page 2.

Fig. 4, "DNS Administration Application 127" should read --DNS Administrative Application, 127-- as shown on the attached page 2.

In the Claims
Column 10, Line 60, Claim 3 should read
--3. The computer-readable medium of claim 1, wherein the code that validates determines that an IP address field is present in the at least one DNS record and successfully validates the request to modify conditional at least upon the IP address field being contained within one or more ranges specified by the at least one policy.--.

Column 11, Line 46, Claim 10 should read
--10. The system of claim 6, wherein the logic that selectively grants the requested modification grants the requested modification conditional at least upon a name in the at least one DNS record being within the infrastructure controlled by the domain owner.--.

Column 12, Line 66, Claim 20 should read
--20. The method of claim 12, further comprising the step of granting the requested modification conditional at least upon a name in the at least one DNS record being within infrastructure controlled by the domain owner.--.

Signed and Sealed this
Twenty-first Day of October, 2014

Michelle K. Lee
*Deputy Director of the United States Patent and Trademark Office*